United States Patent
Libal et al.

(10) Patent No.: US 9,449,483 B2
(45) Date of Patent: *Sep. 20, 2016

(54) SYSTEM AND METHOD OF ANOMALY DETECTION WITH CATEGORICAL ATTRIBUTES

(71) Applicant: HONEYWELL INTERNATIONAL INC., Morristown, NJ (US)

(72) Inventors: Vit Libal, Prague (CZ); Pavel Vacha, Prague (CZ); Valerie Guralnik, Mound, MN (US)

(73) Assignee: HONEYWELL INTERNATIONAL INC., Morristown, NJ (US)

( * ) Notice: Subject to any disclaimer, the term of this patent is extended or adjusted under 35 U.S.C. 154(b) by 0 days.

This patent is subject to a terminal disclaimer.

(21) Appl. No.: 14/682,566

(22) Filed: Apr. 9, 2015

(65) Prior Publication Data

US 2015/0235536 A1    Aug. 20, 2015

Related U.S. Application Data

(63) Continuation of application No. 13/795,796, filed on Mar. 12, 2013, now Pat. No. 9,030,316.

(51) Int. Cl.
*G08B 23/00* (2006.01)
*G06F 11/00* (2006.01)
(Continued)

(52) U.S. Cl.
CPC ......... *G08B 13/22* (2013.01); *G06F 17/30424* (2013.01); *G08B 25/008* (2013.01); *G08B 29/188* (2013.01)

(58) Field of Classification Search
CPC ... G08B 25/008; G08B 29/188; G08B 31/00

USPC ........ 340/517, 518, 523, 526, 500; 707/740, 707/200, 779, 952; 434/236; 715/781, 853; 714/37, E11.029, E11.023, 2, 48, 57, 714/701, 819
See application file for complete search history.

(56) References Cited

U.S. PATENT DOCUMENTS

| | | | |
|---|---|---|---|
| 6,697,497 B1 * | 2/2004 | Jensen | ................... G06T 7/0083 382/100 |
| 6,697,810 B2 * | 2/2004 | Kumar | ................ G06F 11/0709 |

(Continued)

FOREIGN PATENT DOCUMENTS

GB        2477402 A    8/2011

OTHER PUBLICATIONS

Papadimitriou et al, LOCI: Fast Outlier Detection Using the Local Correlation Integral, School of Computer Science, Carnegie Mellon University, Pittsburgh, Pennsylvania, Nov. 2002.

(Continued)

*Primary Examiner* — Hoi Lau
(74) *Attorney, Agent, or Firm* — Husch Blackwell LLP

(57) ABSTRACT

A method and apparatus are provided where the method includes detecting a plurality of events related to the activities of users within a security system, wherein the events are defined by a plurality of attributes, wherein at least one attribute is categorical, and wherein a data distance between events is a function of event attributes, evaluating the detected events using a density based anomaly detection method f(r), where r is a size of a neighborhood around a data point, comparing a value of the evaluated expression with a margin threshold value (msg(r)), and setting an alarm upon detecting that the value exceeds the threshold value.

20 Claims, 1 Drawing Sheet

(51) Int. Cl.
*G08B 13/22* (2006.01)
*G06F 17/30* (2006.01)
*G08B 29/18* (2006.01)
*G08B 25/00* (2006.01)

(56) References Cited

U.S. PATENT DOCUMENTS

| | | | | |
|---|---|---|---|---|
| 7,774,363 | B2* | 8/2010 | Lim | G06F 17/3089 707/781 |
| 7,840,515 | B2* | 11/2010 | Ozdemir | G08B 13/19641 706/12 |
| 7,849,185 | B1* | 12/2010 | Rockwood | H04L 63/14 707/717 |
| 8,171,025 | B2* | 5/2012 | Tsai | G06F 17/30705 707/736 |
| 8,174,378 | B2* | 5/2012 | Richman | G08B 13/19656 340/506 |
| 8,224,761 | B1* | 7/2012 | Rockwood | H04L 63/0263 706/47 |
| 8,554,699 | B2* | 10/2013 | Ruhl | G06F 17/3089 706/12 |
| 8,583,584 | B2* | 11/2013 | Ruhl | G06F 17/3089 706/52 |
| 8,726,085 | B2* | 5/2014 | Akiyama | G06F 21/554 714/26 |
| 8,994,514 | B1* | 3/2015 | Juels | G06K 7/01 340/10.41 |
| 9,030,316 | B2* | 5/2015 | Libal | G08B 25/008 340/517 |
| 9,081,885 | B2* | 7/2015 | Bangera | G06F 19/3456 |
| 9,112,895 | B1* | 8/2015 | Lin | H04L 63/1425 |
| 2006/0161592 | A1* | 7/2006 | Ertoz | G06F 21/552 |
| 2007/0245420 | A1* | 10/2007 | Yong | H04L 12/2602 726/23 |
| 2009/0228980 | A1 | 9/2009 | Zingelewicz et al. | |
| 2010/0223276 | A1* | 9/2010 | Al-Shameri | G06F 17/30333 707/769 |
| 2011/0271146 | A1* | 11/2011 | Mork | G06F 21/55 714/37 |
| 2012/0330611 | A1* | 12/2012 | Libal | G07C 9/00 702/179 |
| 2013/0055145 | A1* | 2/2013 | Antony | G05B 19/41875 715/781 |
| 2013/0055385 | A1* | 2/2013 | Antony | G06F 21/577 726/22 |
| 2014/0172861 | A1* | 6/2014 | Hao | G06F 17/30598 707/740 |
| 2014/0266680 | A1* | 9/2014 | Libal | G08B 25/008 340/517 |
| 2015/0235536 | A1* | 8/2015 | Libal | G06F 17/30424 340/541 |

OTHER PUBLICATIONS

Breunig et al., LOF: Identifying Density-Based Local Outliers, ACM SIGMOD 2000 Int. Conf. On Management of Data, Dallas, Texas, 2000.

Partial European search report for corresponding EP patent application 14157735.3, dated Nov. 13, 2015.

Markus M. Breunig et al., LOF: Identifying Density-Based Local Outliers, SIGMOD 2000 Proceedings of the ACM SIGMOD 2000 International Conference on Management of Date, May 16, 2000, pp. 93-104, Dallas, Texas.

* cited by examiner

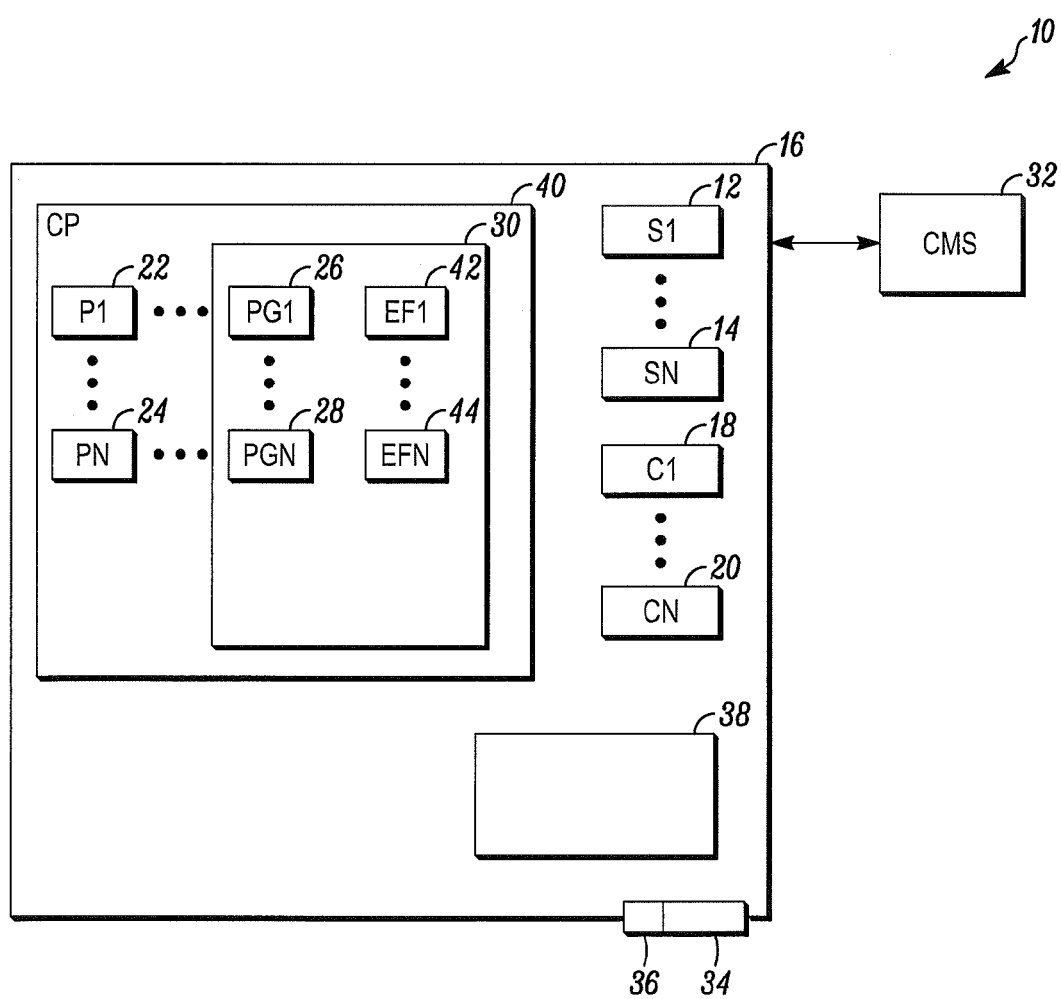

SYSTEM AND METHOD OF ANOMALY DETECTION WITH CATEGORICAL ATTRIBUTES

CROSS-REFERENCE TO RELATED APPLICATION

This application is a continuation of co-pending U.S. application Ser. No. 13/795,796, filed on Mar. 12, 2013, entitled "System and Method of Anomaly Detection with Categorical Attributes", which is incorporated herein by reference.

FIELD

The field of the invention relates to physical security systems and more particularly to methods of detecting anomalous behavior by users of the security system.

BACKGROUND

Security systems are generally known. Such systems typically include a number of sensors that detect security threats associated a secured area. The security threats may include those posed by intruders or by environmental threats such as fire, smoke or natural gas.

Included around the secured area may be a physical barrier (e.g., wall, fence, etc.) that prevents intruders from entering the secured area. A number of portals (e.g., doors, windows, etc.) may be provided around the periphery of the secured area to allow entry into or egress from the secured area.

The doors allowing entrance into the secured area, in turn, may be controlled by a card reader and electric lock that together restrict access through the portal to authorized persons. Each time a card is swiped through the card reader, the reader reads a user identifier from the card and allows access if the identity on the card matches a reference identifier.

While such systems work well, the identification cards used in such systems can be lost or stolen. Accordingly, a need exists for methods of detecting the unauthorized use of such cards.

BRIEF DESCRIPTION OF THE DRAWING

FIG. 1 is a block diagram of a security system shown generally in accordance with an illustrated embodiment.

DETAILED DESCRIPTION OF AN ILLUSTRATED EMBODIMENT

While embodiments can take many different forms, specific embodiments thereof are shown in the drawings and will be described herein in detail with the understanding that the present disclosure is to be considered as an exemplification of the principles hereof, as well as the best mode of practicing same. No limitation to the specific embodiment illustrated is intended.

FIG. 1 is a block diagram of a security system shown generally in accordance with an illustrated embodiment. Included within the security system may be a number of sensors 12, 14 used to detect security threats within one or more secured areas 16 of the security system. In this regard, the secured area may be divided into a number of different security zones 38 with different levels of security.

Under one illustrated embodiment, the sensors may include one or more limit switches mounted to portals (e.g., doors, windows, etc.) that provide entrance into or egress from the secured area. In this way, the sensors may be used to detect intruders entering the secured area.

The sensors may also include one or more environmental detectors (e.g., fire, smoke, natural gas, etc.). The environmental detectors may be used to activate an audible/visual alarm as an indication that the secured area should be evacuated.

Also included within the system may be one or more processor apparatus (processors) 22, 24 located within a control panel 40 of the security system. The processors may operate under control of one or more computer programs 26, 28 loaded from a non-transitory computer readable medium (memory) 30. As used herein, reference to a step performed by a program (or the system) is also a reference to the processor that executed that step of the program.

During normal operation, an alarm processor may monitor a status of each of the sensors for security threats. Upon detecting a threat, the alarm processor may compose an alarm message and send that message to a central monitoring station 32. The central monitoring station may respond by alerting the proper authorities (e.g., police department, fire department, etc.).

In addition to detecting activation of one or more of the sensors, a monitoring processor may also save a record of the event into an event file 42, 44. The record may include an identifier of the sensor activated, a location of the activated sensor and a time of activation.

Also included within or along a periphery of the secured area or zones may be one or more cameras 18, 20. The cameras may operate to collect sequences of video frames and save the images of those frames into memory.

The cameras may operate continuously or only upon the detection of motion within a portion of the secured area. In the regard, motion may be detected via a sensor (e.g., a passive infrared (PIR) sensor) or by operation of a video processor that compares pixel values of successive frames to detect changes consistent with movement of a human within a field of view of the camera.

In some cases, such as motion in a high security area of one of the secured zones, the detection of motion may be regarded as a security threat and an alarm may be raised in accordance with a level of the threat. In other cases, the detection of motion may simply cause the security system to record a sequence of video frames for later evaluation and action. In either case, a record of the event may be saved in an event file. The record may contain an identifier of the camera, the location of the camera and a time of activation.

Located along a periphery of each of the secured area and/or zones may be one or more portals (e.g., doors) 34 that provides entry into and egress from one or more of the secured areas or zones to authorized users. The doors may be provided with an appropriate lock that denies physical entry of unauthorized persons (i.e., intruders) into the secured area.

Associated with the entry doors may be an access control system 36. The access control system may include a recognition device (e.g., card reader, keypad, etc.) coupled to an electric lock. In order to gain entry to the secured area, an authorized person may enter a personal identification number or swipe a card through a card reader in order to activate the electric lock and gain entry to or egress from the secured area.

Each of the access control systems may be monitored and controlled by an access processor within the control panel.

In this regard, the access processor may receive identifiers of persons seeking access to one of the secured areas or zones and compare those identifiers with a list of authorized persons for each corresponding secured area or zone. Upon determining that the person seeking access is authorized, the access processor may send a signal opening the electric lock and granting access to that person into the secured area.

Upon granting access, the access processor may create and save a record of that access into an event file. The information saved within the event file may include an identifier of the person and of the secured area and a time of access.

Also included within the system may be one or more processors that detect trouble with the security system or potential security threats. Potential security threats may include loss of video from a camera or activation of one of the sensors that would not otherwise raise an alarm or activation of an alarm sensor while the system is in a disarmed state. In each case, upon detecting an indication of trouble, the trouble processor may save a record of the event into an event file. The record may include an identifier of the type of trouble, the sensor, camera of other device involved and a time of the event.

In general, the event files of a security system can be an important source of information that can be used to address and identify security vulnerabilities and developing threats. For example, the loss of video from a particular camera may be a simple case of equipment failure or it could be the result of someone intentionally disabling a camera for a short period of time in order to obscure some criminal act.

Similarly, in the case of an organization that secures an area to carry out some enterprise, the saved events caused by the activities of the employees of the organization may be used as an important source of information in detecting disloyal employees or patterns of activity. For example, an employee assigned to some function within a first zone of the secured area may suddenly begin accessing other zones without any apparent reason for doing so. This may indicate that the employee is engaging in some illegal activity or is simply looking for a way to defeat one or more sensors of the security system.

Similarly, a criminal may steal or otherwise come into possession of an access card from an authorized user and attempt to use the access card to gain entry to the secured area during an off-shift or a period when the secured area is, otherwise, vacant. The use of the access card during a time period when an authorized user would not normally use his/her card could be an indication of a security threat.

In one illustrated embodiment, one or more event detection processors may detect events saved into the event files as they occur in real time. Similarly, one or more threat evaluation processors may identify similar past or contemporaneous events and assess threats based upon deviations between the current event and past events. The identification of similar events may be based upon a particular employee, upon a particular sensor, upon a time period, upon a location of an event or upon any of a number of other different unifying factors.

In the illustrated embodiment, a grouping processor may process the data within the event files to consolidate the events $p_i$ into a set of objects P (where $P=(p_1, \ldots, p_i, \ldots, p_N)$ under any of a number of the different unifying factors. Unifying factors may be based upon an identifier of the switch or card reader that triggers the event, the time of the event, an identifier of the person that causes the event or any of a number of other factors that indicate a common source. Once consolidated based upon the unifying factors, the events may be processed to identify any currently detected events that appear as outliers and that indicate the statistical possibility of a security threat. Upon detecting such an event, an alert or alarm may be set by the alarm processor.

Processing of the grouped data may be accomplished under any of a number of different density based anomaly detection methods. One method is described in the publication entitled "LOCI: Fast Outlier Detection Using the Local Correlation Integral" by Papadimitriou et al., School of Computer Science, Carnegie Mellon University, November 2002 or the publication entitled "LOF: Identifying Density-Based Local Outliers" by Breunig et al., ACM SIGMOD 2000 Int. Conf. ON management of Data, Dalles Tex., 2000. Other similar methods may also be used.

For purposes of simplicity, the processing of the grouped data will be described by analogy to the LOCI method. However, it should be understood that the processing of the grouped data may also be accomplished using the similar processes of any of a number of other density based anomaly detection methods.

Under the LOCI method, the grouped data may be processed by a LOCI processor. For example, consider the situation where a particular sensor is activated. In this case, past events involving the same sensor may be evaluated by grouping such events on an x-y basis by considering the interval between activations of the sensor on the x-axis and the number of activations of the sensor on the y-axis (or vice versa). The processor may perform a range-search for all objects that are closer than some maximum radius value $r_{max}$ from a center object $p_i$. The objects may then be sorted to form an ordered list $D_i$ based upon their distance to the center object $p_i$. A value n of the number of r-neighbors of $p_i$ is determined (i.e., $n(p_i,r) \equiv |N(p_i,r)|$, where $N(p_i,r) \equiv \{p \in P | d(p,p_i) \leq r\}$. An average of n (i.e., $\hat{n}$) over the set of r-neighbors is determined $$\left(\text{i.e., } \hat{n}(p_i, r, \alpha) \equiv \frac{\sum_{p \in N(p_i, r)} N(p, \alpha r)}{n(p_i, r)}\right).$$

A standard deviation of $n(p,\alpha r)$ (i.e., $\sigma_{\hat{n}}(p_i,r,\alpha)$) may be determined over a set of r-neighbors of $p_i$ $$\left(\text{i.e., } \sigma_{\hat{n}}(p_i, r, \alpha) \equiv \frac{\sum_{p \in N(p_i, r)} (n(p, \alpha r) - \hat{n}(p_i, r, \alpha))^2}{n(p_i, r)}\right).$$

In order to detect outliers, a multi-granularity deviation factor (i.e., $MDEF(p_i,r,\alpha)$) may be defined for point $p_i$ at radius (or scale)r. Similarly, a normalized deviation (i.e., $\sigma_{MDEF}(p_i,r,\alpha)$) that is directly comparable to MDEF may be defined. Outliers may be determined by a comparison processor that evaluates the expression $MDEF(p_i,r,\alpha) > k_\sigma \sigma_{MDEF}(p_i,r,\alpha)$, where k has a value of 3.

The steps performed by the LOCI processor can be summarized by the pseudo-code as follows.

```
//Pre-processing
For each p_i ∈ P:
    Perform a range-search for N_i = {p ∈ P|d(p_i,p) ≤ r_max}
    From N_i construct a sorted list D_i of the critical and α-
```

-continued

```
        critical distances of p_i
//Post-processing
For each p_i ∈ P,
    For each radii r ∈ D_i (ascending):
        Update n(p_i,αr) and ñ(p_i,r,α)
        From n and ñ, compute
            MDEF (p_i,r,α) and σ_MDEF(p_i,r,α)
        If MDEF(p_i,r,α) > 3σ_MDEF(p_i,r,α), then flag
P_i
            as an outlier and set an alarm.
```

In order to identify outliers using $MDEF(p_i,r,\alpha)$, the above methods need a well-defined local neighborhood upon which the data point population is counted. Local neighborhoods are easily defined for data spaces where the dimensions are continuous attributes because, by definition, a metric, such as a Euclidean metric, may be easily defined for the space composed of continuous variables. The problem arises for categorical attributes that define a category, where there are no generic metrics than can be used. Therefore, for data spaces where one or more categorical attributes represent one or more data spaces dimensions, the local neighborhood cannot be defined.

The need for algorithms that combine continuous and categorical attributes to define its dimensions arises, for instance, in the detection of anomalous events in the context of access control systems for buildings or facilities. An example of the situation in which one may want to perform anomaly detection is in the context where the access data contains time of access, stay duration after the access and a user identifier (ID) that define the dimensions of the three dimensional data space. In this example, the time of access and stay duration are continuous attributes with clear notion of distance and neighborhood between the data points and wherein the user ID represents a categorical attribute, where the distance between two data points cannot be defined and therefore a local neighborhood cannot be established.

The system described herein solves the problem of detecting anomalies associated with categorical data by establishing a distance between the data values in the categorical portion of the data space. Once a distance value is established, then the local neighborhood may be defined for that data space or for any multidimensional data space that combines the categorical and continuous attributes as its dimensions.

One way to define a distance between the categorical data values may be based upon the context of the category of the data or an external knowledge which may be available depending on the meaning of the categorical data and/or depending on the application in which the categorical data are used. For the particular example of user IDs allowing access to a secured area of a security system, the users may be grouped based upon the functions that they perform in the building/facility controlled by the access control system (e.g., maintenance, management, security, laboratory employees, laboratory administrative personnel, etc.) or based on the security zones where the user has access rights.

In another example, the categorical data may be access point identifiers (IDs) of the access controller that controls the card reader and electric lock at that location. In this example, the access point IDs may be grouped based upon their known locations within the building or facility, based upon their assignment to a particular security zone within the facility or based upon the function type of the secured zone where the access control device is located.

Once the categorical data values have been assigned to predefined groups, the distances between the groups may be defined and the defined distance assigned to each related couple of the categorical values according to differences in the group assignment of these two values. For instance, the distance between the access point IDs belonging to the same security zone may be defined as 0 (zero). A distance of the access point IDs from the security zones that are used in areas adjacent to each other may be defined as 1. A distance of the access point IDs from the security zones that are not adjacent but reside on the same floor of the same building may be defined as 2. A distance of the access point IDs from the security zones that reside on different floors may be defined as 3. A distance of the access point IDs from the security zones that reside in different buildings may be defined as 4.

Another example of grouping and assigning distances may be based upon the function type of the secured area associated with the access point. In this example, the distance between two access points, each associated with the spaces of an identical function, may be defined to be separated by a distance of 0. The distance between two access points, each associated with the space of a similar function type, may be a defined distance of 1. The distance between two access points, each associated with spaces of a different function type, may be a defined distance of 2.

Another way of defining the distance between categorical data values may be based upon statistics of the data associated with each categorical value. If there is a sufficient amount of data available for each categorical value, a similarity measure may be defined for the categorical values by comparing the statistics of the data associated with each categorical value. The similarity measure may be based upon the stability of the statistics or any other factor. This would be particularly useful for anomaly detection in multidimensional data spaces where one dimension of the data space is constituted by the categorical attribute and other dimensions are continuous attributes. In these cases the user may construct continuous attribute distributions for each categorical value based upon the statistics. Statistical similarity measures, such as Kullback-Leibler divergence or mutual information may also be used to provide a distance value between two distributions. Once a similarity between each two categorical values is defined, the similarity may be inverted into a distance measure and used to establish the notion of a neighborhood around any categorical value.

In general, density based anomaly detection methods may be used in many different aspects of security systems to increase the security level of a secured area of the facility. In this regard, anomalous events may indicate an irregular activity or behavior and, therefore, may lead to an early discovery of serious security threats. In one example, the system may look for anomalous behavior in events reported by access control devices of a secured area. In other examples, the system may search for anomalous events in the database of security events of an integrated security system that consists of intrusion detection, access control systems, video analytics and other security related subsystems.

In other examples, the system may review events from a system diagnostic apparatus. In this case, the system may analyze and detect defects in particular devices, system failure or evidence of people attempting to exploit system weaknesses.

In general, the system includes an apparatus implementing a method of detecting anomalies. The method includes the steps of detecting a plurality of events related to the activities of users within a security system, wherein the events are defined by a plurality of attributes, wherein at least one attribute is categorical, and wherein a data distance between events is a function of event attributes, evaluating the detected events using a Local Correlation Integral (LOCI) f(r), where r is a size of a neighborhood around a data point, comparing a value of the evaluated expression with a margin threshold value (msg(r)), and setting an alarm upon detecting that the value exceeds the threshold value.

From the foregoing, it will be observed that numerous variations and modifications may be effected without departing from the spirit and scope hereof. It is to be understood that no limitation with respect to the specific apparatus illustrated herein is intended or should be inferred. It is, of course, intended to cover by the appended claims all such modifications as fall within the scope of the claims.

The invention claimed is:

1. A method comprising:
   an event processor detecting a plurality of events related to activities of users within a security system, wherein the plurality of events are defined by a plurality of attributes, wherein at least one of the plurality of attributes is categorical, and wherein a data distance between each of the plurality of events is a function of event attributes;
   an evaluation processor evaluating the detected plurality of events using a selected density based anomaly detection method responsive to a size of a neighborhood around a data point representing each of the plurality of events to establish distances between data values in a categorical portion of a data space;
   a comparison processor comparing a value of the established distances in the categorical portion of the data space with a selected margin threshold value; and
   an alarm processor setting an alarm upon detecting that the value exceeds the threshold value.

2. The method as in claim 1 wherein the function of the event attributes further comprises associating an access point identifier of each of the plurality of events to a predetermined one of a plurality of security zones within a secured area, wherein the distances between the data values are determined based on a spatial arrangement of the plurality of security zones, and wherein said distances are used to establish a notion of the neighborhood around the data point representing each of the plurality of events.

3. The method as in claim 1 wherein the function of the event attributes further comprises associating a user ID of each of the plurality of events to a predetermined one of a plurality of user roles within a secured area, wherein the distances between the data values are determined based on similarity of the associated plurality of user roles, and wherein said distances are used to establish a notion of the neighborhood around the data point representing each of the plurality of events.

4. The method as in claim 1 wherein the function of the event attributes further comprises associating a user ID of each of the plurality of events to a predetermined one of a plurality of security zones within a secured area, wherein the distances between the data values are determined based on differences between the associated plurality of security zones, and wherein said distances are used to establish a notion of the neighborhood around the data point representing each of the plurality of events.

5. The method as in claim 1 wherein the function of the event attributes further comprises continuous data values including at least one of a time of entry into a secured area, a frequency of entry into the secured area per time period, a duration of stay within the secured area after each entry into the secured area, a frequency of travel from one security zone to another security zone within the secured area, and a duration of non-entry into the secured area.

6. The method as in claim 5 further comprising constructing a continuous attribute distribution for each continuous data value associated with each categorical value of a user.

7. The method as in claim 6 further comprising defining a similarity measure using similarity measures including at least a selected divergence or mutual information defined for two distributions.

8. The method as in claim 7 further comprising inverting the similarity measure into a distance measurement and using the distance measurement to establish a notion of the neighborhood around the data point representing each of the plurality of events.

9. An apparatus comprising:
   an event processor that detects a plurality of events related to activities of users within a security system, wherein the plurality of events are defined by a plurality of attributes, wherein at least one of the plurality of attributes is categorical, and wherein a data distance between each of the plurality of events is a function of event attributes;
   an evaluation processor that evaluates the detected plurality of events using a density based anomaly detection method responsive to a size of a neighborhood around a data point representing each of the plurality of events to establish distances between data values in a categorical portion of a data space;
   a comparison processor that compares a value of the established distances in the categorical portion of the data space with a selected margin threshold value; and
   an alarm processor that sets an alarm upon detecting that the value exceeds the threshold value.

10. The apparatus as in claim 9 wherein the event processor and the function of the event attributes further comprise a processor that associates an access point identifier (ID) of each of the plurality of events to a predetermined one of a plurality of security zones within a secured area, wherein the distances between the data values are determined based on a spatial arrangement of the plurality of security zones, and wherein said distances are used to establish a notion of the neighborhood around the data point representing each of the plurality of events.

11. The apparatus as in claim 9 wherein the event processor and the function of the event attributes further comprise a processor that associates a user ID of each of the plurality of events to a predetermined one of a plurality of user roles within a secured area, wherein the distances between the data values are determined based on similarity of the associated plurality of user roles, and wherein said distances are used to establish a notion of the neighborhood around the data point representing each of the plurality of events.

12. The method as in claim 9 wherein the event processor and the function of the event attributes further comprise a processor that associates a user ID of each of the plurality of events to a predetermined one of a plurality of security zones within a secured area, wherein the distances between the data values are determined based on differences between the associated plurality of security zones, and wherein said distances are used to establish a notion of the neighborhood around the data point representing each of the plurality of events.

13. The apparatus as in claim 9 wherein the function of the event attributes further comprises continuous data values including at least one of a time of entry into a secured area, a frequency of entry into the secured area per time period, a duration of stay within the secured area after each entry into the secured area, a frequency of travel from one security zone to another security zone within the secured area, and a duration of non-entry into the secured area.

14. The apparatus as in claim 13 further comprising a processor that constructs a continuous attribute distribution for each continuous data value associated with each categorical value of a user.

15. The apparatus as in claim 14 further comprising a processor that defines a similarity measure using similarity measures including at least a selected divergence or mutual information defined for two distributions.

16. The apparatus as in claim 15 further comprising a processor that inverts the similarity measure into a distance measurement and uses the distance measurement to establish a notion of the neighborhood around the data point representing each of the plurality of events.

17. An apparatus comprising:
a security system that detects security events within a secured area;
an event processor that detects events related to activities of users within a security system, wherein the events are defined by a plurality of attributes, wherein at least one of the plurality of attributes is categorical, and wherein a data distance between each of the events is a function of event attributes;
an evaluation processor that evaluates the detected events using a selected density based anomaly detection method to establish a distance between data values in a categorical portion of a data space;
a comparison processor that compares a value of the established distances in the categorical portion of the data space with a margin threshold value; and
an alarm processor that sets an alarm upon detecting that the value exceeds the threshold value.

18. The apparatus as in claim 17 wherein the function of the event attributes further comprises continuous data values including at least one of a time of entry into the secured area, a frequency of entry into the secured area per time period, a duration of stay within the secured area after each entry into the secured area, a frequency of travel from one security zone to another security zone within the secured area, and a duration of non-entry into the secured area.

19. The apparatus as in claim 17 wherein the function of the event attributes further comprises continuous data values including at least one of a time of entry into the secured area, a frequency of entry into the secured area per time period, a duration of stay within the secured area after each entry into the secured area, a frequency of travel from one security zone to another security zone within the secured area, and a duration of non-entry into the secured area.

20. The apparatus as in claim 17 wherein the event processor and the function of the event attributes further comprise a processor that associates a user ID of each of the plurality of events to a predetermined one of a plurality of user roles within the secured area, wherein the distances between the data values are determined based on similarity of the associated plurality of user roles, and wherein said distances are used to establish a notion of a neighborhood around a data point representing each of the plurality of events.

* * * * *